(12) United States Patent
Song et al.

(10) Patent No.: US 7,286,538 B2
(45) Date of Patent: Oct. 23, 2007

(54) METHOD FOR CHECKING MULTICAST LLID TRANSMISSION IN ETHERNET PASSIVE OPTICAL NETWORK

(75) Inventors: Jae-Yoon Song, Songnam-shi (KR); Jin-Hee Kim, Suwon-shi (KR); A-Jung Kim, Seoul (KR); Min-Hyo Lee, Suwon-shi (KR); Se-Youn Lim, Seoul (KR); Su-Hyung Kim, Seoul (KR); Jong-Ho Yoon, Koyang-shi (KR)

(73) Assignee: Samsung Electronics Co., Ltd., Suwon-Si, Gyeonggi-Di (KR)

( * ) Notice: Subject to any disclaimer, the term of this patent is extended or adjusted under 35 U.S.C. 154(b) by 943 days.

(21) Appl. No.: 10/659,158

(22) Filed: Sep. 10, 2003

(65) Prior Publication Data
US 2004/0057431 A1    Mar. 25, 2004

(30) Foreign Application Priority Data
Sep. 19, 2002    (KR)    ............ 10-2002-0057297

(51) Int. Cl.
*H04J 3/26* (2006.01)
(52) U.S. Cl. .................... 370/392; 370/432
(58) Field of Classification Search ............ 370/390, 370/392, 432, 475
See application file for complete search history.

(56) References Cited

U.S. PATENT DOCUMENTS

| | | | |
|---|---|---|---|
| 6,967,949 B2* | 11/2005 | Davis et al. | 370/390 |
| 2003/0152389 A1* | 8/2003 | Sala et al. | 398/98 |
| 2005/0135365 A1* | 6/2005 | Sung et al. | 370/390 |
| 2006/0039390 A1* | 2/2006 | Boyd et al. | 370/404 |
| 2006/0126627 A1* | 6/2006 | Diouf | 370/390 |

* cited by examiner

*Primary Examiner*—Melvin Marcelo
(74) *Attorney, Agent, or Firm*—Cha & Reiter, LLC

(57) ABSTRACT

A method for checking whether a transmission is a multicast transmission or not is disclosed, which includes in an Ethernet passive optical network including an OLT and multiple ONUs connected to the OLT, checking whether a transmission is a multicast transmission or not by generating a multicast LLID that represents multicast information. Subsequently from a multicast MAC address in a MAC layer in the multiple ONUs or the OLT, so that at least one ONU from among the multiple ONUs or the OLT receives the multicast transmission, the method comprising the steps of: (1) modifying the multicast MAC address and mapping the modified address to a LLID field in a RS layer below the MAC layer; and (2) generating mode information, which represents a multicast transmission, being adjacent to the LLID field and locating the mode information, wherein, the RS layer checks whether a transmission transmitted to the ONU or the OLT is a multicast transmission or not.

8 Claims, 7 Drawing Sheets

| MAC Multicast address | XORed Hash value | LLID |
|---|---|---|
| 01-00-00-00-00-01 | 00 | 00 |
| 01-00-00-00-00-02 | 03 | 03 |
| 01-00-00-00-00-03 | 02 | 02 |
| 01-00-00-00-00-04 | 05 | 05 } a |
| ⋮ | | |
| 01-00-00-00-04-00 | 05 | 05 } b |
| ⋮ | | |

FIG.5

METHOD FOR CHECKING MULTICAST LLID TRANSMISSION IN ETHERNET PASSIVE OPTICAL NETWORK

CLAIM OF PRIORITY

This application claims priority to an application entitled "Method for checking multicast LLID transmission in Ethernet passive optical network," filed in the Korean Intellectual Property Office on Sep. 19, 2002 and assigned Serial No. 2002-57297, the contents of which are hereby incorporated by reference.

BACKGROUND OF THE INVENTION

1. Field of the Invention

The present invention relates to an Ethernet passive optical network (EPON). More particularly, the present invention relates to a multicast transmission in the Ethernet passive optical network.

2. Description of the Related Art

At present, the goal of standardization of Gigabit Ethernet and MAC technology for an asynchronous transfer mode passive optical network (hereinafter, referred to as ATM-PON) has been already completed, and the contents thereof are described in IEEE 802.3z and ITU-T G.983.1. The first type of PON standardized ATM-PON. In the ATM-PON, upward or downward transmission of frames, each of which consists of a predetermined number of ATM cells, is performed. In a PON having a tree-shaped structure, an Optical Line Termination (hereinafter, referred to as "OLT") properly inserts downward cells in the transmitted frame, and then the downward cells are distributed to each Optical Network Unit (hereinafter, referred to as "ONU").

FIG. 1 is a block diagram showing a physical network structure of a conventional passive optical network.

As shown in FIG. 1, the passive optical network includes one OLT 100 and more than one ONUs 110-1 to 110-3 connected to the OLT 100. FIG. 1 shows three ONUs 110-1 to 110-3 are connected to one OLT 100. More than one end user 120-1 to 120-3 (users or network equipment) may be respectively connected to the ONUs 110-1 to 110-3, although the diagram only shows one end user per ONU. Data 131 to 133 transmitted by the users 120-1 to 120-3 are transmitted to the OLT 100 via the ONUs 110.

As shown in FIG. 1, in the structure of the Ethernet Passive Optical Network, which transmits 802.3 Ethernet frames via a point to multi-point network, in the case of upward transmission, all the data of the ONUs are accessed by means of a Time Division Multiplexing (TDM) method. An Optical Distribution Network (ODN), which is a passive element, prevents the data from colliding with each other by means of a ranging method. In other words, in the case of upward transmission, each data of the ONUs 110 are multiplexed and then transmitted to the OLT 100. Also, in the case of downward transmission, each of the ONUs 110 (hereinafter, a plurality of ONUs are referred to as 110-$n$) having received data broadcast by the OLT 100 selectively receives only data, which the ONU must receive, from among the broadcasted data.

For this purpose, each frame in upward or downward transmission has a field arranged in a dedicated ATM cell or a general ATM cell, by which messages can be sent or received at predetermined intervals. With the development of the Internet technology, subscriber-sides have required more and more bandwidths and have been attracted to an end-to-end transmission by means of Gigabit Ethernet which is relatively low-priced and can secure a higher bandwidth, in comparison to the ATM technology, which requires relatively expensive equipment, has limitation in the bandwidth, and must perform segmentation of IP packets. Thus, even in the PON structure of the subscriber network, the Ethernet type is required rather than the ATM.

At present, EPON standardization has been progressing by IEEE802.3ah EFM (Ethernet in the first mile) TF with the aim of September, 2003. An issue of the standardization is the problem of matching, which relates to a layering between an OAM layer and other layer and detail specification works have progressed.

In addition, in the Draft v1.0 of the EPON standardization having been progressing by the IEEE802.3ah, when a communication is performed between an OLT and an ONU, a logical link ID (hereinafter, referred to as LLID) is inserted into a preamble in order to check each packet about whether or not the destination of the packet is the OLT or ONU itself.

FIG. 2 shows a preamble format including a LLID in an EPON and the preamble format has been described in the IEEE 802.3ah baseline. Referring to FIG. 2, 2 bytes are assigned to the LLID in the preamble. A first one byte SOP in the preamble is a start of packet (SOP) byte 10 and represents that a packet has started. The four bytes after the SOP byte 10 are bytes 20 reserved for future purposes. Further, two bytes 30 after the reserved four bytes 20 are assigned to the LLID. A field 40 after the LLID 30 is a CRC which plays a error-checking role, particularly of a checksum of the preamble, which includes meaningful information, in the EPON, in contrast with an existing preamble which is necessary for a reception side to synchronize. The LLID 30 is two bytes in length includes a mode bit 32 having a size of one bit and an ID part 34 having a size of 15 bits. The mode bit 32 represents that a received packet is one of a broadcast packet or a unicast packet. The ID part 34 is used as an identifier of each transmission or reception party. One LLID may be assigned to each ONU, or the LLID subdivides and then other IDs may be assigned according to each service or a user connected to an ONU. However, it is not determined yet which method to employ from among the above two methods.

Hereinafter, an assignation process of the LLID will be described with reference to FIG. 1. A plurality of ONUs 110, which are powered on in an initialization process of an EPON, must pass through an auto-discovery process in which the ONUs 110 are registered to an OLT 100. Herein, the OLT 100 assigns a particular ID to each MAC address by means of MAC addresses of transmission/reception parties, which require registration, and then creates/manages an ID list in a table of the OLT 100. After the registration and assignation of all LLID are performed as described above, the transmission/reception parties of packets transmitted by the ONUs 110 or the OLT 100 in the EPON can be classified according to the LLID in the preamble.

FIG. 3 shows an EPON protocol specification in a draft v1.0. Referring to FIG. 3, an emulation function is integrated into an RS layer (Emulation Function layer) 208. According to the EPON specification, the RS layer 208 checks whether or not a destination of a packet is the RS layer, by means of the LLID. Herein, in general, a MAC layer 204 confirms whether or not a destination of a packet is the MAC layer itself by means of a destination address (DA) of the packet. In contrast, in the EPON, a packet filtering can be performed by a layer below the MAC layer 204.

Referring to FIG. 1, a party represented by the LLID varies according as a transmission direction of a packet is upward (ONU→OLT) or downward (OLT→ONU). In the case of upward transmission, an address represented by the LLID is a party which transmits the packet. In contrast, in the case of downward transmission, the address represented by the LLID is a party which receives the packet. That is, when the OLT 100 receives a packet from the ONUs 110, the OLT 100 compares a LLID in the packet with content of a LLID list registered to the OLT 100 and then determines whether the OLT 100 receives the packet or not. In contrast, when each of the ONUs 110 receives a packet from the OLT 100, each of the ONUs 110 checks whether the content of a LLID in the packet is equal to a LLID assigned to each of the ONUs 110 itself or not, and subsequently determines whether each of the ONUs 110 receives the packet or not.

Herein, when an attribute of a packet is a unicast, an ID value representing a destination is assigned to an ID field. In contrast, when the attribute of the packet is a broadcast, a default LLID for the broadcast is assigned. Accordingly, when each of the ONUs 110 receives a packet and a mode bit of the LLID in the packet represents a broadcast, then each of the ONUs 110 receives all packets. That is, when each of the respective ONUs 110 examines the mode bit of the LLID and the mode bit represents a unicast, each of the ONUs 110 either receives or does not receive a corresponding packet according to an ID. In contrast, when the mode bit of the LLID represents a broadcast, each of the ONUs 110-n receives a corresponding packet regardless of the ID.

However, only unicast and broadcast have been described with respect to the mode bit in the standardization, and a multicast mode, which can transmit data to receivers in a particular group, has not been accurately provided in the present IEEE 802.3ah draft.

Further, for a LLID registration, it is required that a registration process must pass through the present EPON specification. This process is mainly performed as an initialization process and then regularly (or irregularly, as the case may be) provides subsequent registration windows of opportunity to a party that requires to be registered.

However, in the case of a multicast group member, a particular group may be freely registered or terminated by means of a GARP multicast registration protocol (GMRP), which is a multicast group member registration protocol, and the registration or the termination must be performed regardless of a registration window of opportunity provided by an OLT. However, this can't be performed well through the conventional method for registration/termination of a LLID.

SUMMARY OF THE INVENTION

Accordingly, the present invention has been made to solve the above-mentioned problems occurring in the prior art, particularly with regard to multicast group member registration.

In a first aspect of the present invention, a method is provided for checking multicast transmission in a RS layer in order to assign a proper LLID with respect to multicast traffic and allow multicast traffic in an EPON.

In order to accomplish the aforementioned objects, according to an aspect of the present invention, there is provided, in an Ethernet passive optical network including an OLT and multiple ONUs connected to the OLT, a method for checking whether a transmission is a multicast transmission or not by generating a multicast LLID, which represents multicast information, from a multicast MAC address in a MAC layer in the multiple ONUs or the OLT, so that at least one ONU from among the multiple ONUs or the OLT receives the multicast transmission. The method comprises the steps of: (1) modifying the multicast MAC address and mapping the modified address to a LLID field in a RS layer below the MAC layer; and (2) generating mode information, which represents a multicast transmission, being adjacent to the LLID field and locating the mode information, wherein, the RS layer checks whether a transmission transmitted to the ONU or the OLT is a multicast transmission or not.

BRIEF DESCRIPTION OF THE DRAWINGS

The above and other objects, features and advantages of the present invention will be more apparent from the following detailed description taken in conjunction with the accompanying drawings, in which:

FIG. 5 is a view illustrating a filtering operation of a multicast LLID when the multicast LLID is constructed according to the present invention;

DETAILED DESCRIPTION OF THE PREFERRED EMBODIMENT

Hereinafter, a preferred embodiment according to the present invention will be described with reference to the accompanying drawings. It is to be understood that the drawings are presented for purposes of illustration and not for limitation. For the purposes of clarity and simplicity, a detailed description of known functions and configurations incorporated herein will be omitted as it may obscure the subject matter of the present invention.

Figure 1:
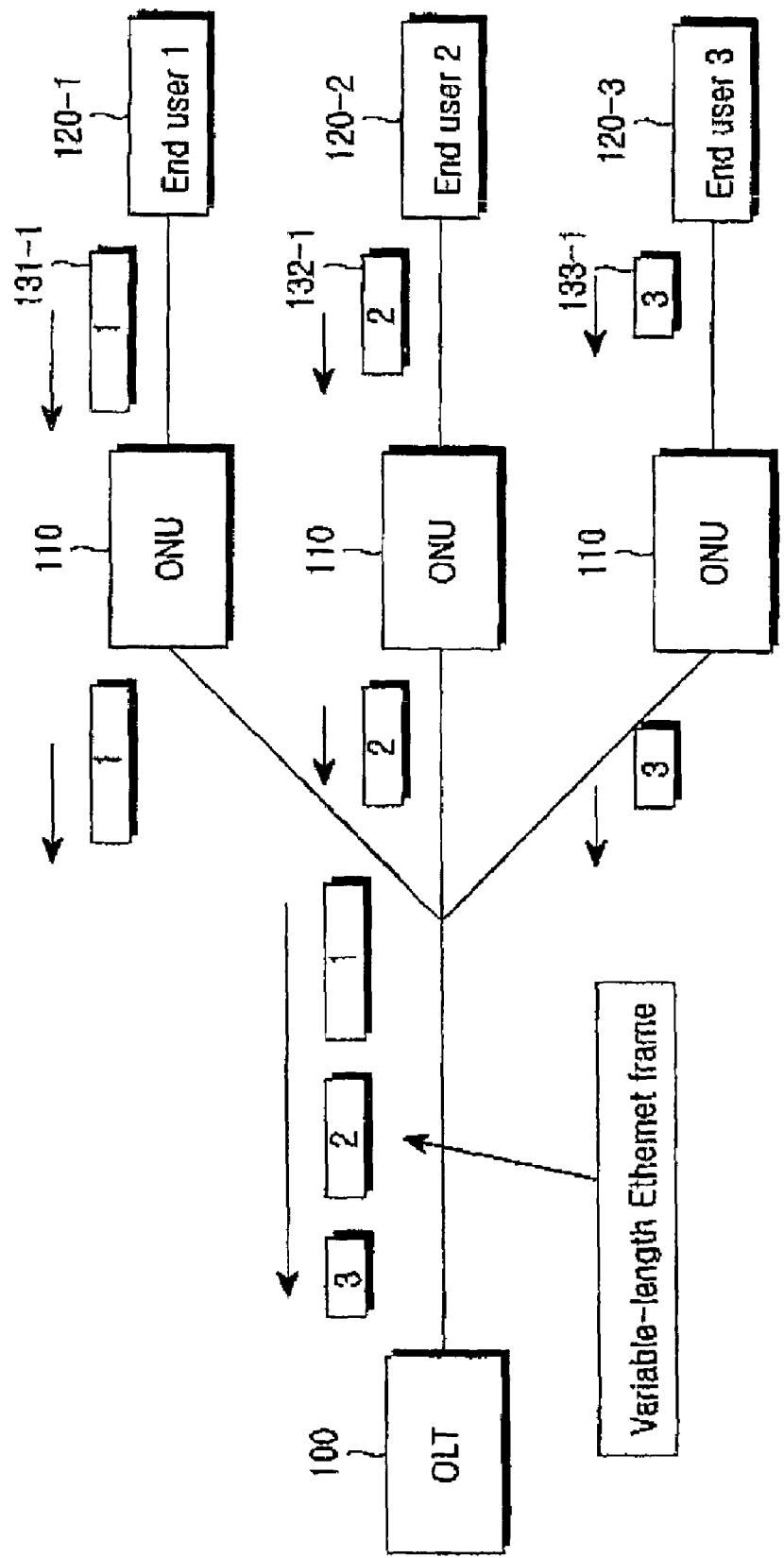
FIG. 1 is a block diagram showing a physical network structure of a conventional passive optical network.
Figure 2:
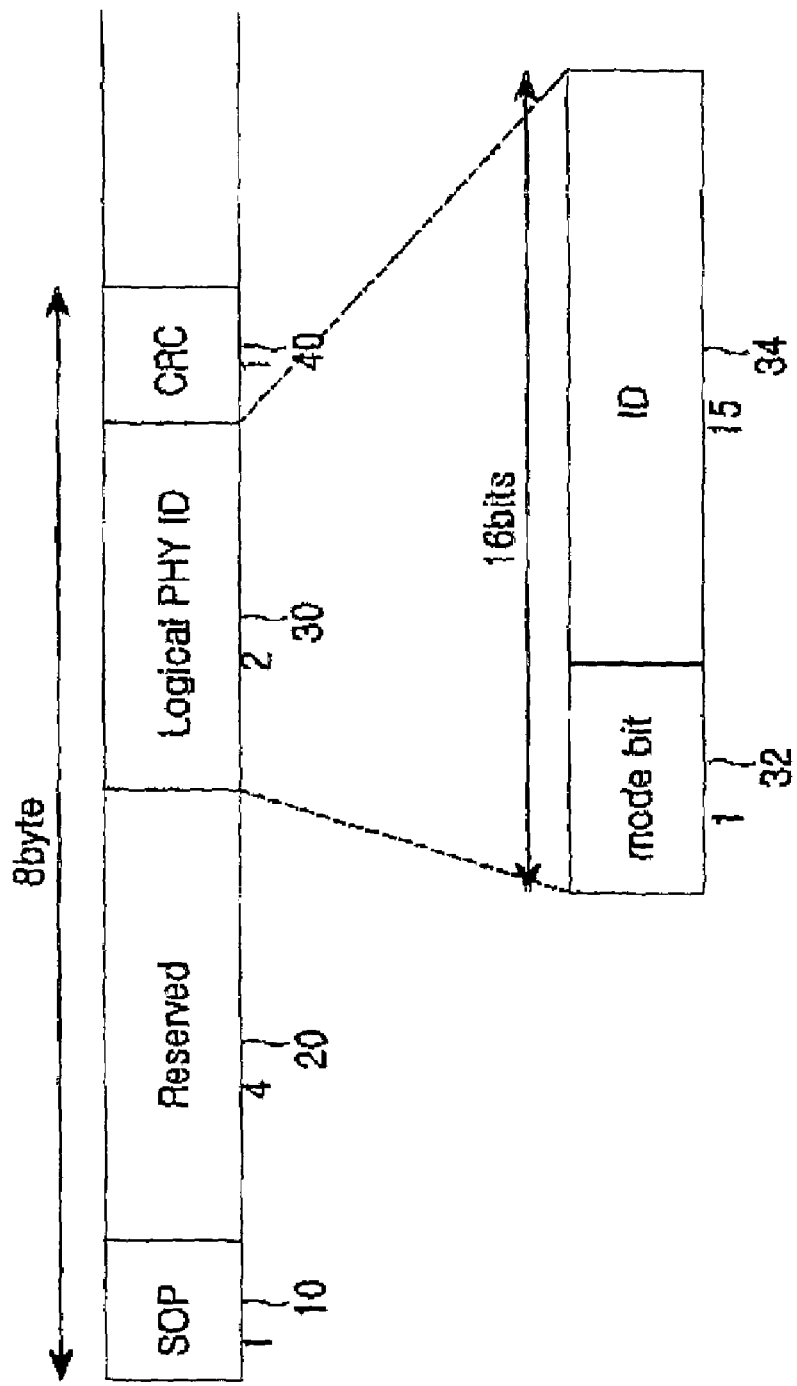
FIG. 2 is a view showing a preamble format including a LLID in an EPON.
Figure 3:
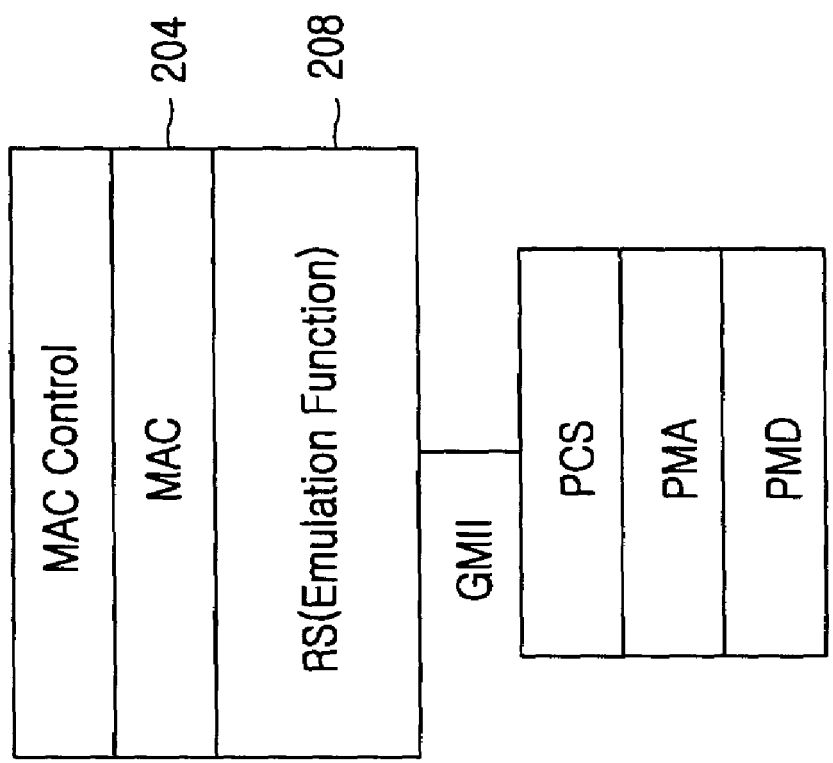
FIG. 3 is a view showing an EPON protocol specification in a draft v1.0.

Referring to FIG. 1, in the auto-discovery process of the EPON, an LLID assigned by the OLT 100 is transmitted to a party such as OLT 100-1, which applies a registration, and therefore the content of the registered LLID is reported. Further, in order to check whether or not a destination of a packet broadcasted to each of nodes is a node itself in the Ethernet-based network, which is basically a shared media, the packet passes through an address filtering process in a MAC layer. In other words, a MAC address possessed by itself is compared with a destination address of an arrived packet in the MAC layer. Therefore, when the MAC address possessed by itself is equal to the destination address of the arrived packet, the arrived packet is received.

In contrast, when the MAC address possessed by itself is not equal to the destination address of the arrived packet, the arrived packet is then discarded. In the case of a multicast address, when an address which has obtained an upper layer protocol such as a GMRP (GARP multicast registration protocol) is reported to a MAC, the MAC puts it in its own address filtering information and then filters it through the process described above.

The present invention provides a method in which a multicast LLID is used in a state in which an OLT does not report an assigned LLID to an ONU. More particularly, according to the present invention, when a multicast MAC address from an upper layer protocol such as a GMRP is reported to a RS layer below a MAC layer, the RS layer puts the multicast MAC address in its own LLID table, compares the multicast MAC address with a LLID of an arrived packet and then performs a filtering.

The present invention will be for purposes of illustration and not interpretation, the following two variations:

(1) A MAC address is mapped to a LLID field having the same size of byte as that in IEEE 802.3ah draft v1.0, by means of a hash function, and then the MAC address is inserted; and (2) A portion of a MAC address is inserted into a LLID field without using a hash function just after increasing a size of byte assigned to a LLID in a preamble, and the inserted MAC address is used. By using one of these variations of the present invention, a multicast address is not filtered in a MAC layer as described above. Instead, the filtering may be performed in a RS layer, which has an emulation function, like other modes in the EPON.

In a case in which the LLID field has the same size bytes as in IEEE 802.3ah draft v1.0 is used, when the LLID field with the same byte size of byte as that of IEEE 802.3ah draft v1.0 is used, a multicast address reported to a MAC is put into a hash function. As a result, a 14 bit address is generated. The generated address is used as the content of an ID field in the LLID and the other two bits are used as a multicast mode bit together with a broadcast and a unicast. This process may be divided into the following two ways according to the bit number of an object, which will be mapped. That is, in a first way, a MAC address is mapped to a LLID by means of only 28 bits corresponding to a rear portion from among the MAC address. In a second way, all 48 bits of a MAC address are mapped to a LLID.

In the case of a multicast IP address in a layer 3, which will be used in the EPON, belongs to a class D. In order to map the multicast IP address to a MAC address in the IEEE LAN, the first 24 bits value is fixed as 0x01-00-5E. The next one bit is reserved which has a value of zero. Further, the other 23 bits is used for representing a group identifier of 28 bits in the class D address. Herein, there exists an overlap problem caused by expressing 28 bits with 23 bits, but a description with respect to this is excluded in the present invention.

In order to map a MAC address for a multicast, which is generated as described above according to the present invention, to a LLID, only 23 bits corresponding to a rear portion from among 48 bits MAC address are mapped into that of 14 bits. That is, in the present invention, only 23 bits for a group identifier are mapped to the LLID. Herein, a hash function, which converts 23 bits data in the MAC address into that of 14 bits in the LLID, is as follows.

Figure 4:
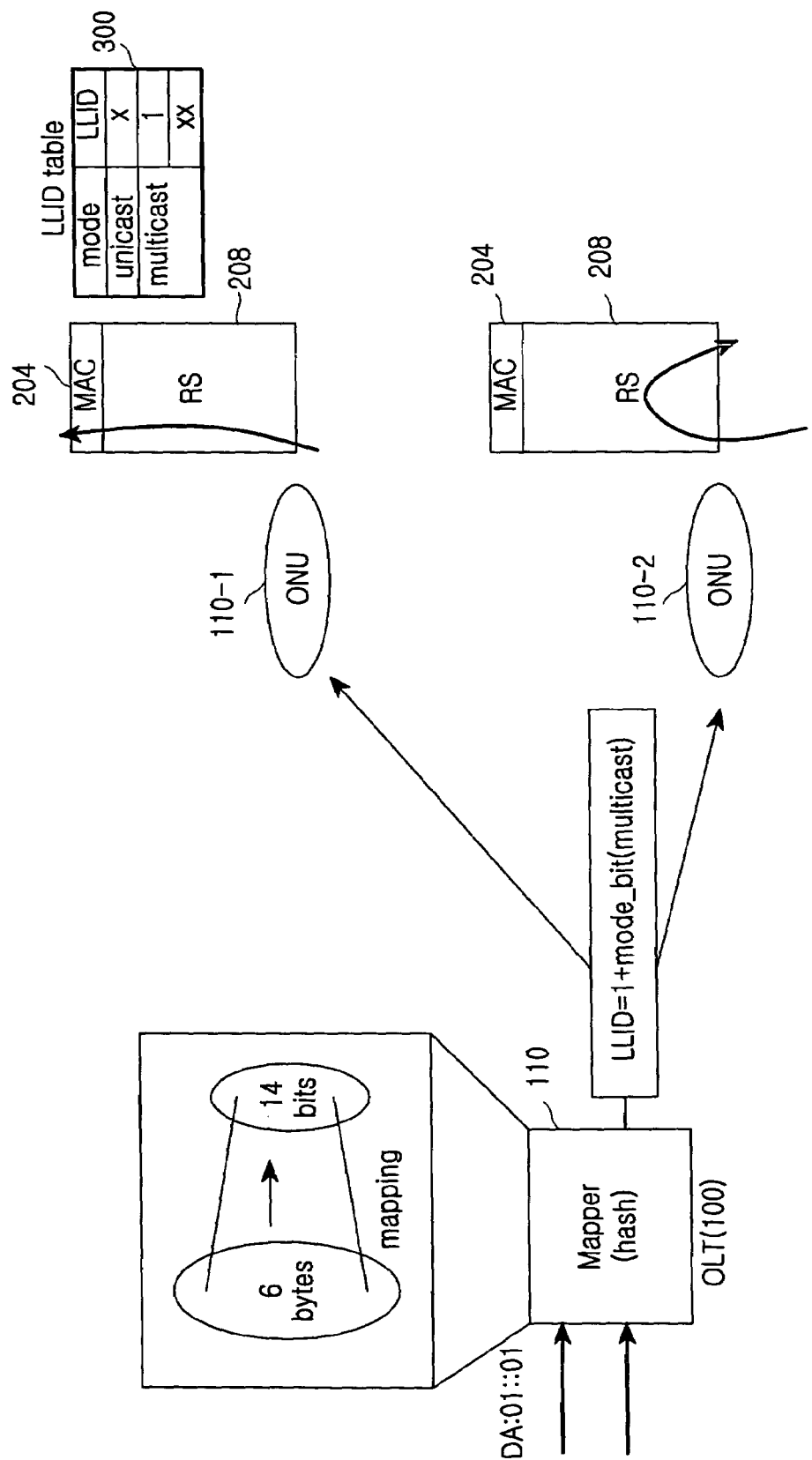
FIG. 4 is a table showing an example in which a multicast MAC address of 48 bits is mapped into that of 14 bits by means of a XOR function.

A hash method is employed, which is used for searching for addresses possessed by itself in an existing bridge. In an effective address search method in accordance with an increase of address lists, which must be managed by the bridge, 23 bits address is compressed to that of eight bits. An example regarding this is shown in FIG. 4. FIG. 4 is a table showing an example in which a multicast MAC address of 48 bits is mapped into that of 14 bits by means of a XOR function. Referring to FIG. 4, each MAC address is expressed by a particular bit. Through this method using the XOR function, a mapping can be quickly and effectively performed. However, in this method, addresses different from each other may be mapped to the same LLID (a and b) as shown in FIG. 4. A hash function, which converts 48 bits data into that of 14 bits, proceeds as follows.

First, a CRC function is used for a checksum in the existing MAC layer. A hash method is employed by means of the CRC function. A CRC-32 function is used in the existing Ethernet. When six bytes of the MAC address is applied to the CRC-32 function, a six bits remainder value Remainder R(x) can be obtained as one of the results. The remainder value is used as a LLID value which is mapped with a MAC address. R(x) has a size of six bits, and therefore R(x) can support 64 kinds of multicast MAC addresses. In this method, a CRC function, which has been stored in the existing MAC in advance, is used as a hash function, and therefore an additional function is not necessary.

Second, a hash method, which is used for searching for addresses possessed by itself in an existing bridge, is employed. In an effective address search method in accordance with increase of address lists, which must be managed by the bridge, 23 bits address is compressed to that of eight bits. An example regarding this is shown in FIG. 4. Referring to FIG. 4, each MAC address is expressed by a particular bit. Through this method using the XOR function, a mapping can be quickly and effectively performed.

FIG. 5 is a view illustrating a filtering operation of a multicast LLID when the multicast LLID is constructed according to a first embodiment of the present invention. A multicast LLID is used in a state in which an OLT does not report an assigned LLID to an ONU, and a case in which a LLID field having the same size of byte as that in IEEE 802.3ah draft v1.0 is used. First, a mapper 110 in an OLT 100 puts a multicast address reported to a MAC into a hash function. As a result, 14 bits address is generated. The generated address is used as the content of an ID field in the LLID and the other two bits are used as a multicast mode bit together with a broadcast and a unicast.

Figure 6:
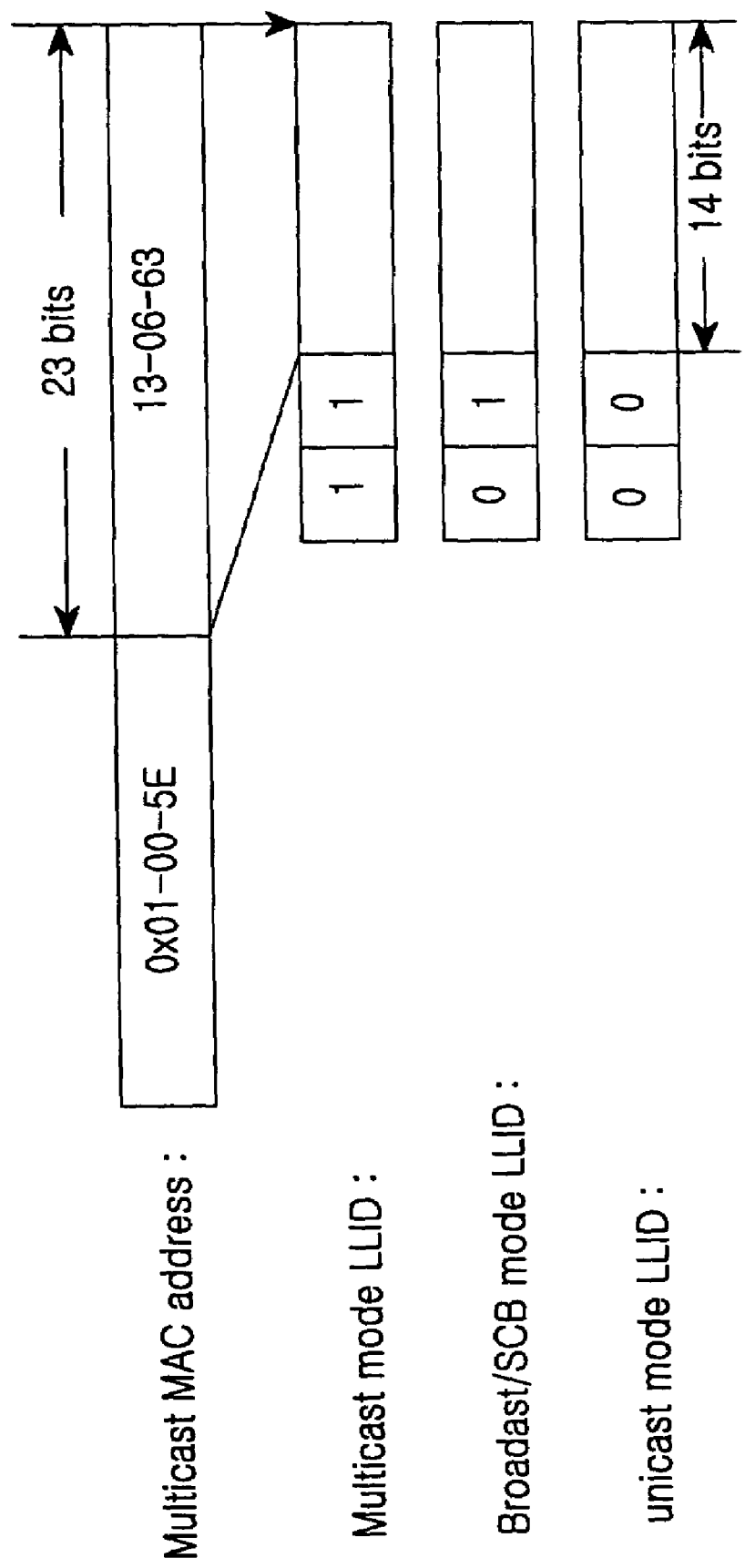
FIG. 6 is a view showing an example in which a multicast MAC address is mapped to a LLID by means of a hash function.

A structure with respect to the above discussed is shown in FIG. 6. The OLT 100 transmits the multicast LLID generated as described above to an ONU 110-*n*. A RS layer 208 of the ONU 110-*n* filters the multicast LLID 300 transmitted from the OLT 100.

FIG. 6 shows an example in which a multicast MAC address is mapped to a LLID by means of a hash function. Referring to FIGS. 1 to 6, 23 bits for a group identifier from among multicast MAC address are mapped to the LLID. The LLID 30 includes 14 bits, in which 23 bits data in the MAC address are mapped, and two bits used as a mode bit. As shown in FIG. 6, since the mode bit is two bits, the mode bit can represent that a transmission method is a broadcast, a unicast or a multicast. FIG. 6 also shows a case in which 23 bits corresponding to a rear portion from among the multicast MAC address are mapped into 14 bits in the LLID, but 48 bits in the MAC address may be mapped into 14 bits in the LLID as described above.

Figure 7:
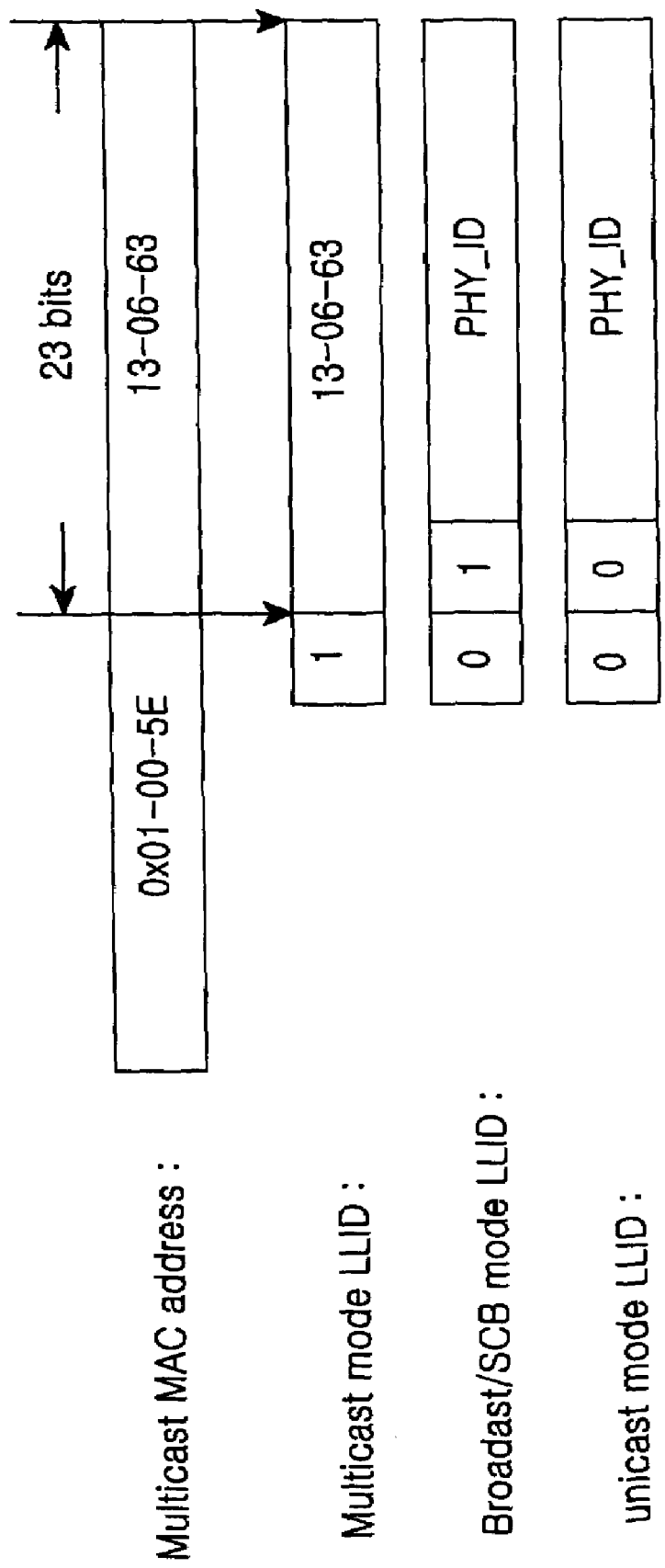
FIG. 7 is a view showing an example in which a multicast MAC address is mapped to a LLID without using a hash function.

FIG. 7 shows an example in which a multicast MAC address is mapped to a LLID without using a hash function, in a case in which a byte size assigned to an LLID increases in a second preamble.

Referring to FIG. 7, the size of the byte assigned to the LLID increases as many as one and then the MAC address is just inserted into the LLID field without using a hash function. As described above, the first 23 bits have always fixed value. Accordingly, an address portion, which must be differentiated, comprises 23 bits after the 23 bits have a fixed value. Accordingly, in the present invention, two bytes assigned to a LLID in IEEE 802.3ah/D1.0 increases into three bytes and then the increased three bytes are just mapped without using a hash function. A first bit from among three bytes LLID is assigned to a multicast mode bit representing whether an address is a multicast or not. That is, when a value of the first bit is one, an address after the first bit is multicast. Further, when the value of the first bit is zero, an address after the first bit represents the other mode such as a broadcast mode or a unicast mode. 23 bits after the first bit uses an address corresponding to a rear portion from among the MAC address. In this case, a preamble having not been used is utilized, and therefore an additional hash function is not necessary.

Further, in the case of modes except for the multicast, a second bit is assigned to represent a corresponding mode. As shown in FIG. 7, when a value of the second bit is one, the second bit represents a broadcast and a single copy broadcast (SCB) mode. Further, when the value of the second bit is zero, the second bit represents a unicast.

A multicast group member generated by a GMRP, which is a upper protocol, is applied to a EPON, thereby enabling a RS layer to perform an address filtering similarly to the existing other modes such as a broadcast mode or a unicast mode. Further, similar cases of other LLIDs, an auto-discovery process is performed, thereby freely enabling the multicast group member to be registered and terminated without receiving an assignation of a LLID.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for checking whether a transmission is a multicast transmission or not in an Ethernet passive optical network including an Optical Line Termination (OLT) and multiple Optical Network Units (ONUs) connected to the OLT by generating a multicast logical link ID (LLID) that represents multicast information, from a multicast Medium Access Control (MAC) address in a MAC layer in one of the multiple ONUs or the OLT, so that at least one ONU from among the multiple ONUs or the OLT receives the multicast transmission, the method comprising the steps of:
    (a) modifying the multicast MAC address and mapping the modified address to an LLID field in a Regenerator Section (RS) layer below the MAC layer; and
    (b) generating mode information that represents a multicast transmission, and arranging the mode information in a position adjacent to the LLID field,
    wherein, the RS layer checks whether a transmission transmitted to the said at least one ONU selected from among the multiple ONUs or the OLT is a multicast transmission or not.

2. The method according to claim 1, wherein in step (a) the multicast MAC address is modified by using a hash function.

3. The method according to claim 2, wherein the hash function comprises an XOR function that searches for addresses, which are self contained in an existing bridge.

4. The method according to claim 1, wherein the multicast MAC address is modified in step (a) by applying CRC function for a checksum in a MAC layer.

5. The method according to claim 1, wherein the RS layer adds the generated LLID to an address list, which is self contained in order to check whether a transmission is a multicast transmission or not.

6. The method according to claim 1, wherein the multicast MAC address has a size of 48 bits, and 23 bits for a group identifier from among 48 bits of the multicast MAC address are mapped into 14 bits of the LLID field in the RS layer below the MAC layer in step (a).

7. The method as claimed in claim 1, wherein the multicast MAC address has a size of 48 bits, and 48 bits of the multicast MAC address are mapped into 14 bits of a LLID field in the RS layer below the MAC layer in step (a).

8. A method for checking whether a transmission is a multicast transmission or not in an Ethernet passive optical network including an Optical Line Termination (OLT) and multiple optical network units (ONUs) connected to the OLT by generating a multicast logical link ID LLID that represents multicast information, from multicast Medium Access Control (MAC) addresses in a MAC layer in one of the multiple ONUs or the OLT, so that at least one ONU from among the multiple ONUs or the OLT receives the multicast transmission, the method comprising the steps of:
    (a) increasing a quantity of bytes of a preamble assigned to the LLID and then inserting a group identifier from among the multicast MAC addresses into an LLID field in a Regenerator Section (RS) layer below the MAC layer; and
    (b) generating mode information that represents a multicast transmission, locating the mode information in a position adjacent to the LLID field,
    wherein, the RS layer checks whether a transmission transmitted to the ONU or the OLT is a multicast transmission or not.

* * * * *

UNITED STATES PATENT AND TRADEMARK OFFICE
CERTIFICATE OF CORRECTION

PATENT NO. : 7,286,538 B2  Page 1 of 1
APPLICATION NO. : 10/659158
DATED : October 23, 2007
INVENTOR(S) : Jae-Yoon Song et al.

It is certified that error appears in the above-identified patent and that said Letters Patent is hereby corrected as shown below:

Title Page
Item [73], Assignee's address, should read as follows:

--Gyeonggi-Do.--

Signed and Sealed this

Eighteenth Day of December, 2007

JON W. DUDAS
*Director of the United States Patent and Trademark Office*